United States Patent [19]

Weiss

[11] Patent Number: 5,018,910

[45] Date of Patent: May 28, 1991

[54] PROCESS FOR INCREASING THE QUANTITY OF POWDER DISPENSED IN A POWDER COATING SYSTEM, AS WELL AS POWDER COATING SYSTEM

[75] Inventor: Hardy P. Weiss, Hutten, Switzerland

[73] Assignee: Prazisions-Werkzeuge AG, Hutten, Switzerland

[21] Appl. No.: 484,489

[22] Filed: Feb. 26, 1990

Related U.S. Application Data

[63] Continuation of Ser. No. 118,988, Nov. 10, 1987, abandoned.

[30] Foreign Application Priority Data

Nov. 15, 1986 [DE] Fed. Rep. of Germany ....... 3639139

[51] Int. Cl.[5] .............................................. B65G 53/50

[52] U.S. Cl. ...................................... 406/144; 406/14; 406/19; 406/146; 406/108; 406/122

[58] Field of Search ............... 406/153, 144, 194, 195, 406/142, 146, 86, 92, 138, 145, 62, 108, 197, 12, 122, 14, 19, 30, 124, 91; 118/308, 312, 317, 622; 239/405, 104; 134/166 C, 169 C; 366/165

[56] References Cited

U.S. PATENT DOCUMENTS

| | | | |
|---|---|---|---|
| 228,206 | 6/1880 | Luckenbach | 406/144 |
| 1,566,517 | 12/1925 | Bergman | 406/146 X |
| 1,718,507 | 6/1929 | Wenzel et al. | 406/144 X |
| 1,970,405 | 8/1934 | Thomas | 406/144 X |
| 2,695,265 | 11/1954 | Degnen | 406/144 X |
| 2,758,564 | 8/1956 | Randall | 406/144 X |
| 2,912,942 | 11/1959 | Whitney, Jr. et al. | 406/144 X |
| 2,924,489 | 2/1960 | Beckmann | 406/142 X |
| 3,149,884 | 9/1964 | Jones | 406/144 X |
| 3,251,653 | 5/1966 | Aditya | 366/165 X |
| 3,403,942 | 10/1968 | Farnworth | 406/144 X |
| 3,412,898 | 11/1968 | Marynowski | 406/142 X |
| 3,425,601 | 2/1969 | Fry | 406/144 X |
| 3,442,454 | 5/1969 | Stenger et al. | 406/144 |
| 3,746,254 | 7/1973 | Duncan et al. | 406/144 X |
| 4,506,834 | 3/1985 | Ek | 406/144 X |
| 4,521,139 | 6/1985 | Kretschmer et al. | 406/142 X |
| 4,561,808 | 12/1985 | Spaulding | 406/144 X |
| 4,569,161 | 2/1986 | Shipman | 406/144 X |
| 4,637,339 | 1/1987 | Walser | 118/622 |

FOREIGN PATENT DOCUMENTS

| | | | |
|---|---|---|---|
| 268126 | 10/1987 | European Pat. Off. | 406/93 |
| 2202326 | 7/1973 | Fed. Rep. of Germany | 406/146 |
| 2248859 | 4/1974 | Fed. Rep. of Germany | 406/146 |
| 121483 | 8/1976 | Fed. Rep. of Germany . | |
| 3423202 | 1/1986 | Fed. Rep. of Germany | 406/146 |
| 1409826 | 7/1965 | France | 406/108 |
| 271325 | 10/1989 | Japan . | |
| 1106082 | 3/1968 | United Kingdom . | |
| 1249746 | 10/1971 | United Kingdom . | |

*Primary Examiner*—Margaret A. Focarino
*Assistant Examiner*—James M. Kannofsky
*Attorney, Agent, or Firm*—Antonelli, Terry, Stout & Kraus

[57] ABSTRACT

In a powder coating system wherein the powder is introduced via a feed conduit from the feed point to a mixing chamber, a pressure gradient oriented against the chamber is produced along the feed conduit by acceleration of a gas jet in the mixing chamber, and pressure recovery is obtained by retarding the powder-gas stream, in order to feed the powder-gas stream through a conveying line to a coating unit. For increasing the quantity of powder dispensed per unit time to the powder coating system, the pressure drop in the powder-gas stream along the conveying line is at least in part compensated for by raising the pressure at the feed point.

17 Claims, 4 Drawing Sheets

PROCESS FOR INCREASING THE QUANTITY OF POWDER DISPENSED IN A POWDER COATING SYSTEM, AS WELL AS POWDER COATING SYSTEM

This application is a continuation of application Ser. No. 07/118,988, filed Nov. 10, 1987, now abandoned.

BACKGROUND AND SUMMARY OF THE INVENTION

The present invention relates to process for increasing the quantity of powder dispensed per unit time to a powder coating system, wherein the powder is fed via a feed conduit from a feed point to a mixing chamber by producing along the feed conduit, by accelerating a gas jet in the mixing chamber, a pressure gradient oriented against the chamber, and by obtaining pressure recovery by retarding the powder-gas stream in order to feed the powder-gas stream through a conveying line to a coating arrangement, as well as to powder coating systems with a powder tank connected via a conduit with a mixing chamber, a conveying gas nozzle terminating in the latter in order to generate in the mixing chamber a vacuum with respect to the tank by gas jet acceleration, a conveying line for gas-powder mixture leading to a coating arrangement from this mixing chamber.

For coating substrates with a synthetic resin, two methods can be utilized, in principle. In the first method, a synthetic resin is present in a dissolved state. In this procedure, the solution is applied to the surface to be coated and the solvent is subsequently evaporated. In a second method, extremely fine synthetic resin powder is applied to a surface. In most cases, the application is enhanced by static electricity. The applied powder is then made to melt by the action of heat. Thereby, a synthetic resin layer that adheres to the surface is produced.

The present invention is basically concerned with the second-mentioned technique. In the latter, the difficulty encountered time and again resides in applying the synthetic resin powder uniformly to the surface to be coated, and for this purpose primarily a uniform conveyance of the powder is necessary. The powder cannot be transported over relatively long distances under the influence of gravity. A conveying medium, customarily a conveying gas, is required to be able to convey the powder along horizontal, or at least not only vertical distances. Specifically, the present invention thus relates to the aforementioned coating technique wherein relatively long conveying paths must be traversed between a powder tank and a coating unit.

Such a conventional coating system is illustrated schematically in FIG. 1. As indicated by arrow F, coating powder is filled into a storage tank 1. A feed conduit 3 connects the tank 1 with a mixing chamber 5. By means of a nozzle 7 terminating in the mixing chamber 5, a gas jet G produced by a pressure source 9, such as a compressor, is accelerated and injected into the mixing chamber 5.

The symbol $p_1$ denotes the pressure in tank 1, $p_7$ denotes the pressure in the feed conduit for the conveying gas G, and $p_5$ is the pressure in the mixing chamber 5. Based on the jet acceleration at the nozzle 7, a pressure gradient $\Delta p_{75}$ is produced. In the mixing chamber 5, a vacuum prevails initially with respect to the static pressure in the gas feed conduit 7. Due to the accelerated gas in the chamber 5, a static pressure gradient $\Delta p_{15}$ is produced from tank 1 to chamber 5. Thereby, powder is transported from tank 1 into mixing chamber 5 and blended in mixing chamber 5 with the gas jet G. The powder-gas mixture is then discharged from the mixing chamber 5 through a conveying line 11. In a section 13 between mixing chamber 5 and conveying line 11, the powder-gas stream is decelerated whereby the kinetic energy in the mixing chamber 5 is converted into pressure energy and thus static pressure recovery occurs. By way of the conveying line 11, the powder-gas stream is then fed to a coating unit which is frequently relatively far remote from the tank 1, as is the case with the coating unit 21 illustrated schematically in the bottom portion of FIG. 1. This is a coating unit for the internal coating of pipes or structures having the shape of a tubular section, as utilized for the internal coating of can bodies, for example. In this process, first of all can bodies 15 not as yet joined along the longitudinal edges, i.e. not as yet closed all around, are fed by way of an overhanging arm first to a joining station 19, such as a welding station, and then further transported by way of arm 17 to a coating unit 21. The conveying line 11 for the coating powder is extended over the entire length of arm 17 axially through the latter and exits from the arm 17 only in the coating zone. At that location, enhanced by static electricity (not shown), the powder is applied to the inner surface of the can bodies 15 and excess powder is customarily removed again by suction for recovery. In this arrangement, it can be seen that relatively long conveying lines must be traveled between the so-called injector, generally denoted by 8, to the powder dispensing point.

On account of friction losses, there occurs a constant pressure drop in the powder-gas stream along the conveying line 11. These losses are represented in FIG. 1 by $\Delta p_{11}$. These losses are overcome, inter alia, by the energy of the gas jet injected into the mixing chamber 5. This energy is sufficient for deflection and acceleration of the powder-gas mixture and for overcoming the aforementioned losses at the conveying line 11. It is an object of the present invention to increase the amount of powder dispensed per unit time to a coating unit, such as the arrangement 21 of FIG. 1. For this purpose, several measures present themselves, initially. Increasing the kinetic energy of the gas jet injected into the mixing chamber 5 which could be attained by raising the conveying pressure $p_7$ or increasing the acceleration with the utilization of a Laval nozzle. The higher conveying pressure $p_7$ has only a minor effect on the quantity of powder conveyed as soon as the pressure ratio at the nozzle, $p_7/p_5$, becomes higher than the critical pressure ratio, which is about 1.7 in case air is used as the gas. Furthermore, increasing the conveying pressure $p_7$ is extraordinarily expensive, since this pressure must in any event lie considerably above the pressure of the mixing chamber, $p_5$, and the pressure $p_1$ in the tank 1, which latter pressure is ordinarily atmospheric pressure.

The higher kinetic energy attained with the use of a Laval nozzle cannot be utilized on account of the poor degree of efficiency of jet expansion and, respectively, retardation and, respectively, on account of poor recovery of static pressure. An increase in the pressure ratio $p_7/p_5$ above the critical proportion, such as by means of a Laval nozzle, furthermore results in unstable flow in the conveying line 11 due to the then occurring compression shock wave.

A further possibility for increasing the amount of powder dispensed would be enlarging the quantity of gas injected per unit time into the mixing chamber 5. With a given conveying line configuration, this leads to damming up and, respectively, pressure buildup in the mixing chamber 5 and to a pressure drop $\Delta p_{11}$ over proportionate to the amount of powder conveyed through line 11.

The above-mentioned problem is solved, according to this invention, by partially compensating for a pressure drop in the powder-gas stream along the conveying line by raising the pressure at the feed point. Thereby, the pressure drop $\Delta p_{11}$ according to FIG. 1 is not overcome by the energy of the gas jet injected through nozzle 7 but rather by the excess pressure $p_1$ generated according to this invention in tank 1. The injected gas jet G now serves predominantly for the acceleration and guidance of the powder within the mixing chamber 5, and as a consequence the momentum of the gas jet injected through nozzle 7 can additionally be reduced substantially, with the amount dispensed being the same or being increased. By variation of the excess pressure $p_1$ in tank 1, the conveyed quantity can be set.

Thus, a powder coating system of the invention of the type discussed hereinabove for solving the aforementioned problem, has a powder tank in communication with a mixing chamber via a conduit, a conveying gas nozzle terminating in the mixing chamber, in order to produce a vacuum with respect to the powder tank by gas jet acceleration in the mixing chamber, a conveying line for gas-powder mixture leading from the mixing chamber to a coating unit, characterized in that the powder tank is connected to a pressure source.

Furthermore, the amount of powder dispensed can herein be improved, with the use of a minimum quantity of gas passed through the nozzle, by optimizing the degree of jet expansion efficiency or, respectively, the degree of effective retardation. In other words, by optimizing the recovery of the static pressure at the aforementioned gas jet.

This has been attained in the process of the type described above by constantly decelerating the powder/-gas stream in the mixing chamber and by mixing the powder through the feed conduit in the region of highest gas flow velocity with the gas stream.

As contrasted to the illustration according to FIG. 1 showing the structure, in principle, of conventional mixing chambers, the deceleration section is thus located in accordance with this invention directly adjacent to the nozzle orifice, which makes it possible to achieve the desired improvement in pressure recovery.

By way of explanation customarily, one speaks of jet expansion and/or compression in case of deceleration and/or acceleration of the jet. However, since, for example, in case of the Laval nozzle, the jet in the expansion zone or spreading zone is further accelerated, the behavior of the jet is herein described using the more unequivocal kinetic terms of "acceleration", "deceleration".

A powder coating system of the invention of the aforementioned type, for solving the problem stated above, has a powder tank in communication with a mixing chamber via a conduit, a conveying gas nozzle terminating in the mixing chamber, in order to produce a vacuum with respect to the tank by gas jet acceleration in the mixing chamber, a conveying line for gas-powder mixture leading from the mixing chamber to a coating unit characterized in that the mixing chamber has a section coaxial with respect to the axis of the nozzle and widening with constancy with respect to the nozzle orifice to the diameter of the conveying line.

As likewise shown in FIG. 1, it is conventional to extend the feed conduit 3 for the powder so that it is perpendicular, at least in one component, to the axis of the injected gas jet G of the mixing chamber 5. In this connection, there is a certain danger that powder settles in the mixing chamber, as 5 in FIG. 1. This leads to changes in the pressure and flow characteristics within the mixing chamber 5, and this, in turn, results in impairment of the dispensed powder quantity in the aforementioned sense. In order to solve this problem, which also has a negative effect on the above-mentioned powder quantity, it is further suggested according to the present invention that in a process of the type discussed above wherein a powder stream is fed from the feed conduit at least in one component perpendicularly to the axis of the gas jet of the mixing chamber, to introduce the powder stream eccentrically with respect to the axis of the gas jet into the mixing chamber to bring about a self-cleaning rotational flow of the powder-air stream. More specifically, according to the present invention, if in FIG. 1, the axis of the feed conduit 3 is extended so that, as seen in the direction toward the nozzle 7, the axis of the latter and the axis of conduit 3 do not intersect, then the flow of the powder-gas mixture becomes rotational. That is, a self-cleaning vortex is created in the mixing chamber 5 or, in any event, in the subsequent conduit 11.

A powder coating system of the invention of the aforementioned type which solves this last-discussed problem for obtaining an increased amount of powder dispensed, or of conveyed quantity, comprises a powder tank in communication with a mixing chamber via conduit, a conveying gas nozzle terminating in the mixing chamber, in order to produce a vacuum with respect to the tank by gas jet acceleration in the mixing chamber, a conveying line for the gas-powder mixture leading from the mixing chamber to a coating unit, wherein the conduit terminates in the mixing chamber with an axial direction being at least in one component perpendicular to the axial direction of the nozzle characterized in that the conduit terminates eccentrically with respect to the nozzle axis.

It is readily understood that an optimum effect in light of the problem on which this invention is based is attained by combining two or three of the aforementioned specific methods according to this invention and/or by combining two or more of the features of this invention inherent in the above described several powder coating systems of the invention.

If, according to the first-mentioned process of this invention, or according to a combination with this process, the pressure at the feed point into the feed conduit is raised, then it is further suggested to fluidize the powder upstream of the mixing chamber. This can take place in the tank, such as tank 1 according to FIG. 1 and/or along the feed conduit 3 between the tank and the mixing chamber and/or injector 8.

In a process wherein the powder-gas stream is constantly decelerated, as described above, it is furthermore proposed to continuously accelerate the gas jet by means of a nozzle, and to operate the nozzle with a subcritical pressure ratio.

By constant and, respectively, continuous acceleration, an axially parallel efflux is obtained at an exit cross section of the nozzle, such as the nozzle of FIG. 1.

By operating the nozzle with a pressure ratio smaller than the critical one, when using air as the gas at a ratio of $p_7/p_5 <$ about 1.7, shock waves in the mixing chamber are avoided and the formation of a free jet is made possible. Furthermore, it is suggested for as optimal a pressure recovery as possible to allow the nozzle exit jet to decelerate to at least almost a free jet.

For ensuring a continuous, accumulation-free discharging of the powder through the feed conduit, such as conduit 3 in FIG. 1, it is suggested in the above-discussed powder coating system wherein the tank is connected to a pressure source, furthermore to provide a fluidizing plate in the zone where the conduit leaves the tank, and a feed line for a fluidizing gas. With preference, a conveying unit for the fluidizing gas is utilized also as the pressure source for raising the pressure in the tank.

Upon exposure of the aforementioned tank to excess pressure the problem arises that the tank must be charged time and again, or continuously, with powder without bringing about a pressure equalization between the tank and its surroundings.

This problem is solved by providing a powder charging conduit at the container, with a pressure decoupling arrangement, such as a cellular wheel sluice, for feeding powder from a pressure level on the inlet side to a pressure level on the tank side.

If furthermore, as mentioned, fluidizing air is introduced into the tank as a preferred feature for fluidizing the powder in the zone of the feed conduit, then measures must be taken making it possible to exhaust the thus-introduced air after the desired excess pressure has been attained. This is achieved by providing at the tank a pressure regulating arrangement, such as a pressure regulating valve, preferably with a filtering unit for suspended powder. Thereby, after establishing the desired excess pressure, the additionally introduced fluidizing air is removed and the powder particles that are in all cases suspended therein are filtered out by the filtering unit.

In a powder coating system according to this invention wherein the mixing chamber exhibits a section coaxial to the axis of the nozzle and constantly widening with respect to the nozzle orifice up to the cross section of the conveying line, it is further proposed to provide that the section flares at least almost to the extent of the jet boundary angle of a gas free jet forming at the nozzle, preferably with an angle of about 15° or less, with respect to the nozzle axis. This permits optimum pressure recovery.

It is furthermore suggested in this system, in order to achieve optimum injection conditions at the mixing chamber with a minimum amount of gas and with a minimum gas conveying pressure, especially to realize an axially parallel flow in the region of the nozzle orifice, to provide a bore of the conveying gas nozzle which steadily narrows toward its orifice, the ratio of the diameters from the unconstricted section to the nozzle orifice being preferably larger than 5.

In order to be able furthermore to optimally adjust the conditions at the mixing chamber in dependence on the powder to be conveyed or in accordance with manufacturing tolerances, it is preferred that the nozzle in the mixing chamber be axially adjustable.

To provide for optimum influx and intermixing of the powder and of the gas jet with low losses and without interfering turbulences, it is furthermore provided that the conduit terminates in the chamber with a transverse component with respect to the nozzle axis and that a flow duct section of the chamber provides a continuous transition from the conduit entrance point into the deceleration section.

Preferably, this flow duct section and the subsequently flaring deceleration section constitute, similarly to a Laval nozzle of constant curvature, a constriction in the section facing the conveying line, the nozzle orifice lying in the zone of this constriction. Thereby, an annular nozzle is formed about the nozzle orifice projecting into the constriction zone, for introduction of the powder. Consequently, the powder is uniformly introduced along the mixing chamber periphery.

These and other objects, features and advantages of the present invention will become more apparent from the following description when taken in connection with the accompanying drawings, which show, for purposes of illustration only, several embodiments in accordance with the present invention.

Figure 1:
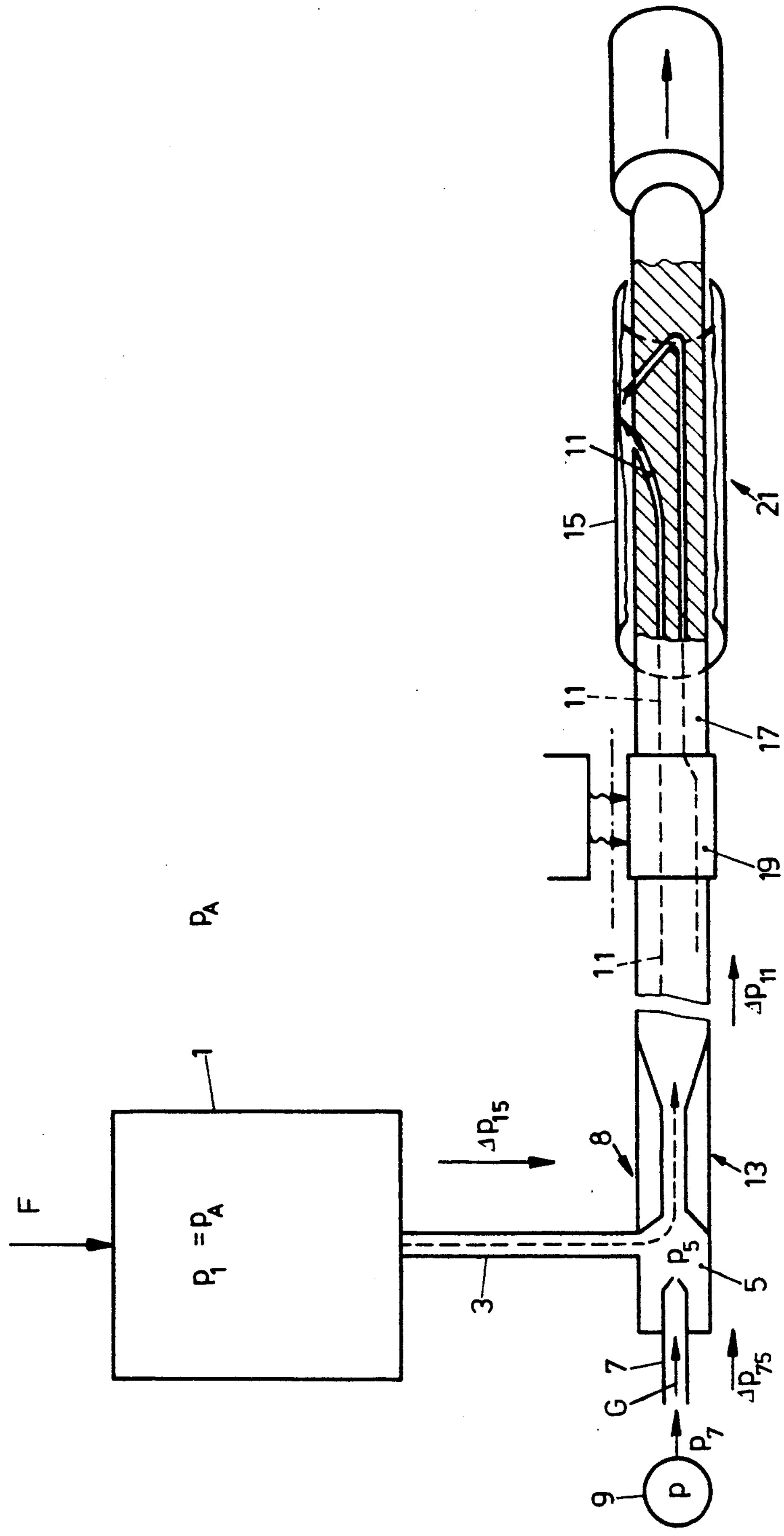
FIG. 1 is a schematic view, partially in cross-section, showing the structure of conventional mixing chambers as discussed above.
Figure 2A:
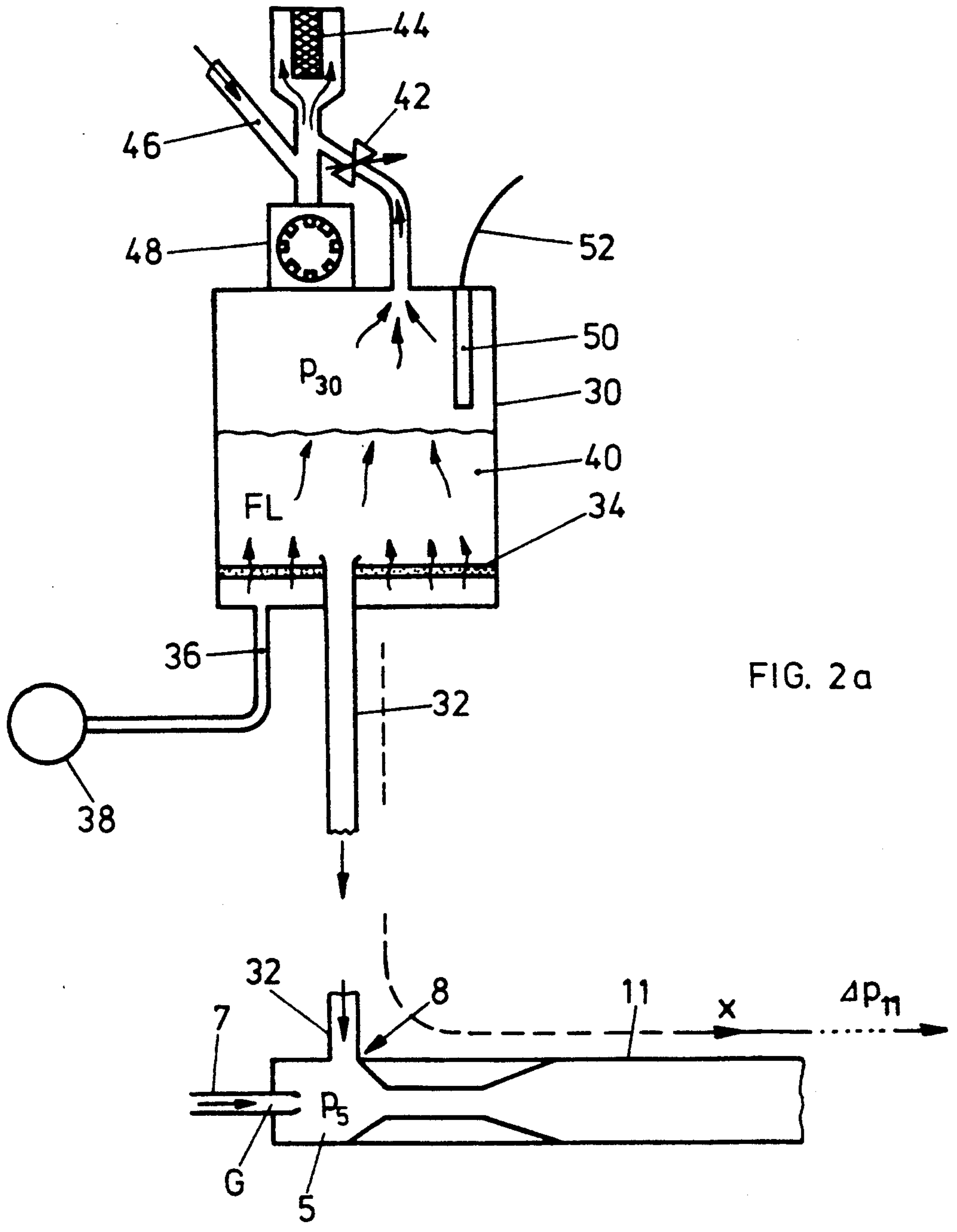
Figure 2B:
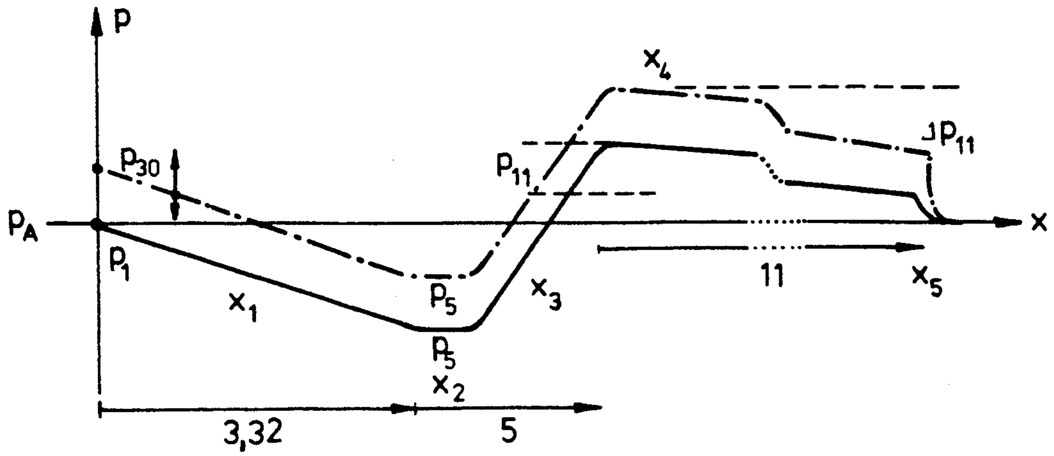
Figure 3:
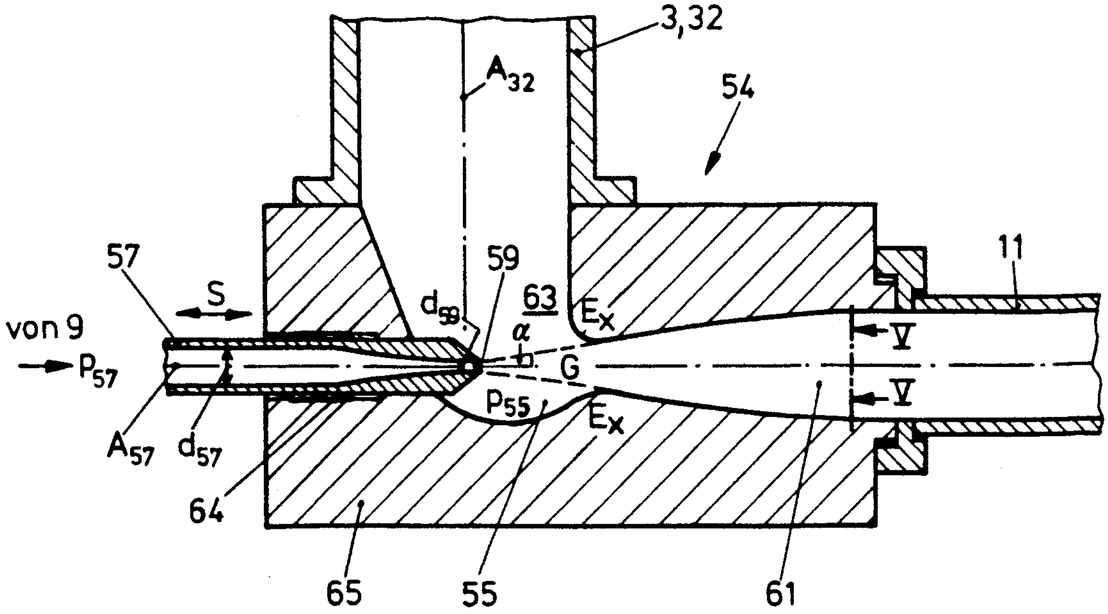
Figure 4:
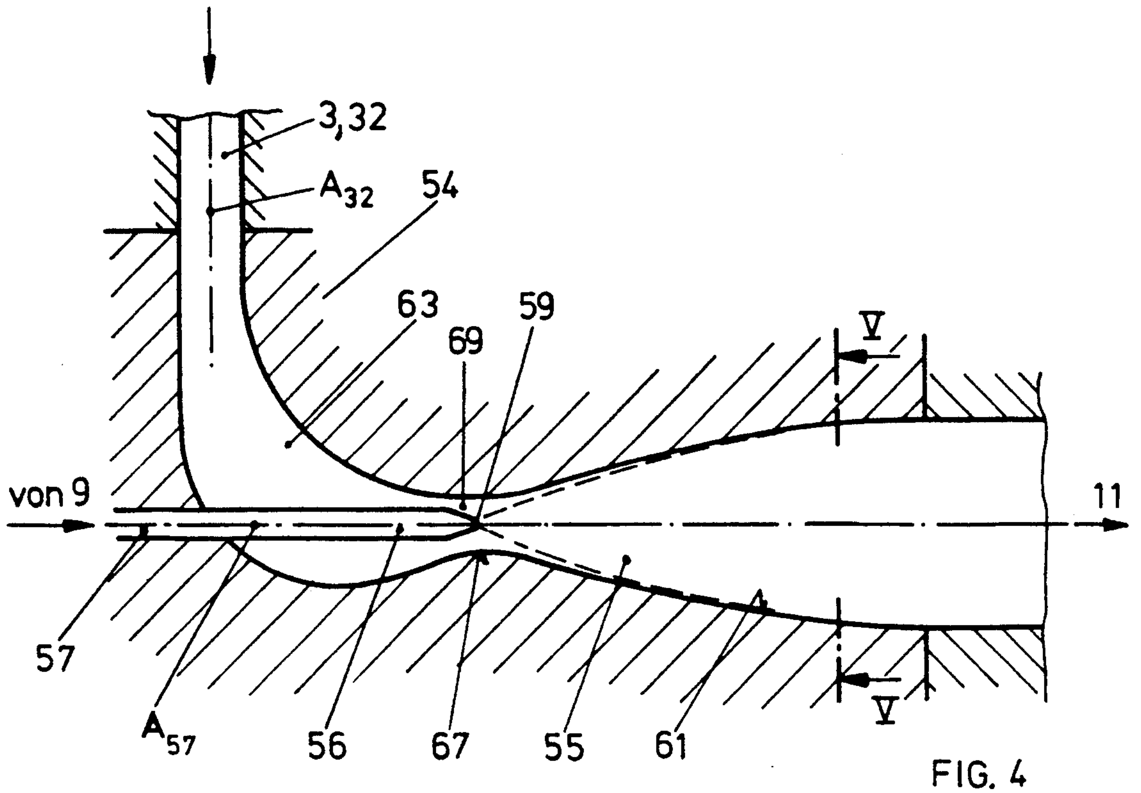
Figure 5:
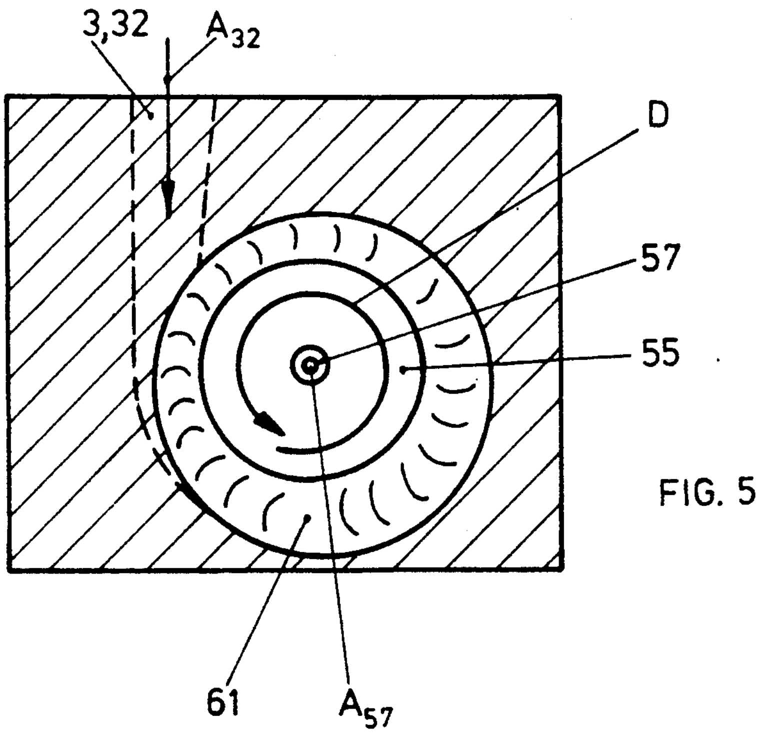

FIG. *2a* is a schematic view of the structure of a tank according to this invention, taking the place of a tank 1 of FIG. 1, in a system in accordance with this invention;

FIG. *2b* shows qualitatively the static pressure curve along the powder conveying path;

FIG. 3 is a longitudinal section through an injector according to this invention, taking the place of 8 in FIG. 1, in a system in accordance with this invention;

FIG. 4 is a schematic view of another version of an injector according to this invention, in a system in accordance with this invention; and FIG. 5 is a schematic longitudinal sectional view of a further version of the injector according to this invention taken along the line V—V in FIG. 3 or 4, in a system according to this invention.

DETAILED DESCRIPTION OF THE DISCLOSED EMBODIMENTS

FIG. *2a* shows a powder tank 30 in a system according to this invention, taking the place of tank 1 in a conventional system as shown in FIG. 1. The tank 30 is connected via a feed conduit 32 to an injector 8 according to FIG. 1, preferably to an injector designed in accordance with this invention and described further below. In the zone of the outlet of the feed conduit 32, a porous fluidizing plate 34 is arranged in the tank 30, and below the fluidizing plate 34 a fluidizing gas line 36 enters the tank 30. Through line 36, a fluidizing gas FL, preferably air, is gently blown with the aid of a blower of a conventional type, as illustrated schematically at 38, through the fluidizing plate 34 into the coating powder 40 located thereabove. In general, a pressure generating member is provided at the tank 30 in order to expose the powder 40 to an excess pressure $p_{30}$ with respect to ambient pressure.

It is, of course, possible to arrange for this purpose a pressure generating member specifically for this operation. However, it is preferred to employ the blower 38 and the fluidizing air line 36 and/or the fluidizing air FL for this pressurizing step. Furthermore, a pressure regulating device 42, such as a pressure regulating valve or a slide, is provided at the tank 30. Once the desired excess pressure $p_{30}$, adjustable at the pressure regulating device 42, prevails in tank 30, then the additional fluidizing air FL is exhausted through the pressure regulating device 42, such as a pressure regulating valve, by way of a filter 44. The filter 44 is provided to filter out powder particles suspended in the escaping fluidizing air. The tank 30 is charged with fresh powder via a conduit 46 and a schematically illustrated cellular wheel sluice 48 which latter ensures that, during charging of the tank 30 with powder, there will be no pressure equalization between the interior of the tank and the surroundings. A level control means 50 with electrical output wires 52 monitors the powder level in the tank 30 and controls, or regulates, not shown, optionally the quantity of powder fed via conduit 46 and cellular wheel sluice 48. In FIG. *2a* at the bottom, the injector 8 of FIG. 1 is once again illustrated, the dashed lines illustrating a path coordinate x of the powder from the tank via the feed conduit 32 through the injector 8 into the conveying line 11.

FIG. *2b* shows, in a purely qualitative fashion, the pressure curve along the path coordinate x, in solid lines for an arrangement according to FIG. 1 wherein atmospheric pressure is present in tank 1, and in dot-dash lines for the embodiment of this invention according to FIG. *2a*, wherein an excess pressure $p_{30}$ above atmospheric pressure is provided in tank 30.

In the system shown in FIG. 1, the pressure drops, from atmospheric pressure $p_A$, which corresponds to the tank pressure $p_1$, down to a subatmospheric pressure valve $p_5$ in the mixing chamber 5 of the injector 8. The subatmospheric pressure is produced by the accelerated gas jet from the nozzle 7, $x_1$. Up to the diverging section of the injector, the pressure, apart from pressure losses, remains almost at the value $p_5$, $x_2$. In the abruptly diverging section, pressure recovery occurs, i.e., the kinetic energy of the injected gas jet G is converted into potential pressure energy, and the static pressure rises, $x_3$. Friction losses along the conveying line 11 now effect pressure drop $\Delta p_{11}$, $x_4$, until the exit at the coating unit 21 according to FIG. 1 where the powder-air mixture is ejected into atmospheric pressure, $x_5$.

According to the invention, as shown in FIG. *2b*, the internal pressure in tank 30 is raised, leading to the qualitative curve as illustrated in dot-dash lines. The entire characteristic is raised by the excess pressure corresponding to pressure $p_{30}$, which has a strong effect on the quantity of powder conveyed through line 11. Raising the pressure in the mixing chamber 5, $p_5$, and the associated reduction in pressure difference $p_7$ to $p_5$ according to FIG. 1 do not result in any substantial reduction in the quantity conveyed. By increasing the internal tank pressure $p_{30}$, it is even possible to reduce the conveying pressure $p_7$ as well as the quantity of gas injected via nozzle 7, the amount dispensed being the same or larger.

The excess pressure $p_{30}$ takes care of overcoming the pressure losses along the conveying line 11 while the kinetic energy of the injected gas jet, preferably an air jet, merely enhances the powder acceleration and effects guidance of the powder. With the aid of setting the excess pressure $p_{30}$ by means of the pressure regulating device 42, the amount of powder conveyed through line 11 is adjusted. FIG. *2b* furthermore shows the reference numerals of the parts according to FIG. *2a* traversed along the progressive travel path x.

FIG. 3 shows the structure of an injector according to this invention which can be used in place of the injector 8 in the system of FIG. 1 or, in place of the injector 8 in the system of FIG. *2a*. The injector 54 comprises a mixing chamber 55 into which terminates a nozzle 57 with orifice 59. Coaxially to the axis $A_{57}$ of the nozzle 57, the mixing chamber 55 has a section 61 which widens immediately downstream of the orifice. The section 61 terminates steadily into the conveying line 11, arranged coaxially to the axis $A_{57}$ of the nozzle Transversely to the axis $A_{57}$ of the nozzle 57, the feed conduit 3 according to FIG. 1, or 32 according to FIG. *2a*, ends in the mixing chamber 55.

Via the nozzle 57, a gas jet G, preferably an air jet, is injected into the mixing chamber 55 and is decelerated immediately downstream of the nozzle orifice 59 by the feature that the divergent mixing chamber section 61 starts directly after the nozzle entrance 59. The jet G exits from the nozzle 57 as a free jet, and the boundary of section 61 is designed in correspondence with the jet boundary angle $\alpha$ of the free jet with respect to the axis $A_{57}$, that is at an angle of 15° or less. Between the nozzle orifice 59 and the onset of section 61, the deflection and acceleration of the inflowing powder take place whereby the gas jet is additionally delayed and thus spreads out with a jet boundary angle larger than about 8°, which is the jet boundary angle of the free jet which expands unimpeded.

Due to the fact that the jet G emitted by the nozzle 57 can decelerate, as a free jet, unimpeded in section 61, an optimum pressure recovery results, i.e., there is an optimal conversion of the kinetic jet energy into potential pressure energy at the termination of conduit 11. The nozzle 57 is operated at a subcritical pressure ratio $p_{57}$ to $p_{55}$ whereby shock waves are avoided and free jet expansion is made possible. To ensure that axially parallel flow prevails in the outlet cross section at the orifice 59 of the nozzle 57, the inner bore of the nozzle 57 is designed to converge with constancy. As illustrated, the proportion of the diameter $d_{57}$ in the nonconvergent nozzle to the orifice diameter $d_{59}$ is preferably larger than 5. A flow duct 63 is provided between the connection of the feed conduit 3 or 32 and the section 61, this duct providing a constant transition into the zone 61. The steadily curved transition from the conduit connection at conduit 3 or 32 to the divergent section 61 furthermore prevents erosion of the injector by the accelerated powder particles, especially at the mixing chamber sites denoted by $E_x$ in FIG. 3. For producing the free jet, the nozzle 57 furthermore terminates in the mixing chamber 55 with a sharp edge. For optimization of the axial nozzle position with respect to the onset of section 61, the nozzle 57 is axially displaceable, as indicated by the double arrow S, for example by way of a precision thread 64 between the nozzle 57 and the mixing chamber block 65.

FIG. 4 illustrates a further version of the injector according to this invention. With reference to FIG. 3, identical numerals denote the same elements. The flow duct 63 between entrance of the feed conduit 3 or 32 and exit into the conveying line 11 is fashioned in the shape of a constant-curvature Laval nozzle. In this arrangement, the nozzle 57 projects with its orifice 59 into the zone of the nozzle constriction 67 coaxially to the constriction cross section, whereby an annular nozzle 69 is produced between the body 56 of the nozzle 57 and the wall of the flow duct 63 in the zone 67, serving for the powder fed via conduit 3 or, respectively, 32.

In a variation of the injector 54 according to FIG. 3 or 4, the axis $A_{32}$ of the feed conduit 3 or 32, the axis of the subsequent flow channel 63, and the axis of the nozzle 57; or of section 61, $A_{57}$, lie in one plane. However, in order to prevent deposition of powder in zones of the mixing chamber, especially upstream of section 61, a further embodiment according to FIG. 5, provides that the axis $A_{32}$ is located eccentrically with respect to axis $A_{57}$ of the nozzle and, respectively, of section 61. Thereby a self-cleaning rotation is imparted to the powder fed via conduit 3 or 32 in the mixing chamber 55, resulting in a vortex D as shown schematically.

With the aid of one or several of the above-described feature of this invention in connection with the injector and/or the powder tank, a drastic increase in the powder quantity conveyable per unit time through a given conveying line 11 is attained while keeping trouble to a minimum, and without having to effect an increase in the pressure and/or quantity of a conveying gas, such as air, introduced via nozzle into an injector.

By optimum configurational design at the injector, structural design of the injector nozzle, pressurization of the powder fed thereto, a simple measure is proposed which hardly raises the operating costs of such a system but leads to an essential improvement of the system.

While I have shown and described only several embodiments in accordance with the present invention, it is understood that the same is not limited thereto, but is susceptible to numerous changes and modifications as known to those skilled in the art. Therefore, I do not wish to be limited to the details shown and described herein but intend to cover all such changes and modifications as are encompassed by the scope of the appended claims.

I claim:

1. A process for selectively setting the quantity of powder continuously dispensed per unit of time out of an outlet of a powder coating system, comprising:

feeding the powder out of a powder container to a mixing chamber by generating a pressure drop from said powder container to said mixing chamber by means of a gas jet injected into said mixing chamber;

propelling said powder fed to said mixing chamber out of said chamber into a conveying line to said outlet by said jet of gas;

enlarging a diameter of said conveying line downstream and adjacent said mixing chamber to recover static pressure by retarding said powder and said gas;

propelling said powder and said gas along said conveying line and out of said outlet predominately by a pressure difference of said static pressure recovered and a static pressure of a surrounding of said outlet; and settling the quantity of powder dispensed per unit of time out of said outlet of the powder coating system by setting the static pressure within said powder container independently from generation of said gas jet injected into said mixing chamber so as to settle said pressure difference by said pressure recovery and said static pressure selectively settled.

2. Process according to claim 1, further comprising constantly decelerating the powder-gas stream in the mixing chamber and mixing the powder in the region of highest gas flow velocity with the gas.

3. Process according to claim 2, wherein a powder stream is fed from the powder container via a feed conduit into the mixing chamber at least in one component perpendicularly to the axis of the gas jet, and further characterized in that the powder stream is fed to the mixing chamber eccentrically with respect to the axis in order to generate a self-cleaning rotational flow of the powder-air stream with respect to the conveying line.

4. Process according to claim 1, wherein a powder stream is fed from the powder container via a feed conduit into the mixing chamber at least in one component perpendicularly to the axis of the gas jet, and wherein the powder stream is fed to the mixing chamber eccentrically with respect to the axis in order to generate a self-cleaning rotational flow of the powder-air stream with respect to the conveying line.

5. Process according to claim 1, wherein the powder is fluidized upstream of the mixing chamber.

6. Process according to claim 1, wherein the gas jet is steadily accelerated by means of a nozzle operating with a sub-critical pressure ratio.

7. Process according to claim 1, wherein the gas jet is allowed to decelerate in the mixing chamber at least almost to the free jet condition.

8. Process according to claim 1, wherein said step of settling includes providing a pressurized gas to said powder container and setting and maintaining an excess static pressure of said gas in said powder container with a pressure regulating device for regulating the pressure of said gas within said powder container.

9. Process according to claim 8, including fluidizing powder in said powder container with said pressurized gas.

10. Powder coating system comprising a powder tank, a mixing chamber, a conduit communicating from said powder tank with said mixing chamber, a coating unit, a conveying gas nozzle terminating in the mixing chamber, in order to produce a vacuum with respect to the powder tank by gas jet acceleration in the mixing chamber, said mixing chamber being linked by a steadily widened line section arranged coaxially with respect to the axis of said gas nozzle to a conveying line for gas-powder mixture leading from said line section to the coating unit and means for controlling settlement of the amount of powder ejected per time unit from said coating unit by respective settling the static pressure within said tank independently from generation of said gas jet into said mixing chamber, said powder being conveyed along said conveying line due to combined action of said gas jet and of said static pressure.

11. Powder coating system according to claim 10, wherein the conduit terminates in the mixing chamber with an axial direction being at least in one component perpendicular to the axial direction of the nozzle, and wherein the conduit terminates eccentrically with respect to the nozzle axis.

12. Powder coating system according to claim 10, wherein a fluidizing plate is provided in the zone where the conduit leaves the powder tank, and a feed line for a fluidizing gas such as air is provided as well.

13. Power coating system according to claim 10, wherein said means for controlling includes a pressure source for providing a fluidizing gas to said tank.

14. Powder coating system according to claim 13, wherein said means for controlling further comprises a pressure regulating device provided at the powder tank.

15. Powder coating system according to claim 14, wherein said pressure regulating device is connected with a filter for filtering out suspended powder.

16. Powder coating system according to claim 10, wherein a powder charging conduit is provided at the powder tank, with pressure decoupling means for feeding the powder from a pressure level on the inlet side of the powder charging conduit to a pressure level on the powder tank side thereof.

17. Powder coating system according to claim 16, wherein said pressure decoupling means is a cellular wheel sluice.

* * * * *